(12) United States Patent
Kemmerer

(10) Patent No.: US 10,897,663 B1
(45) Date of Patent: Jan. 19, 2021

(54) ACTIVE TRANSIT VEHICLE CLASSIFICATION

(71) Applicant: BOSE CORPORATION, Framingham, MA (US)

(72) Inventor: Jeremy Kemmerer, Holliston, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/690,375

(22) Filed: Nov. 21, 2019

(51) Int. Cl.
| | |
|---|---|
| *G10K 11/16* | (2006.01) |
| *H04R 1/10* | (2006.01) |
| *H04R 29/00* | (2006.01) |
| *G10L 25/51* | (2013.01) |
| *G06N 5/04* | (2006.01) |
| *G06N 20/00* | (2019.01) |
| *G10K 11/175* | (2006.01) |

(52) U.S. Cl.
CPC ............. *H04R 1/1041* (2013.01); *G06N 5/04* (2013.01); *G06N 20/00* (2019.01); *G10K 11/175* (2013.01); *G10L 25/51* (2013.01); *H04R 1/1083* (2013.01); *H04R 29/001* (2013.01)

(58) Field of Classification Search
CPC ................ H04R 2430/01; G06F 3/165; G10K 2210/1282; H04M 9/082
USPC ............................. 381/94.1–94.3, 71.1, 71.4
See application file for complete search history.

(56) References Cited

U.S. PATENT DOCUMENTS

| | | | |
|---|---|---|---|
| 8,948,415 B1 * | 2/2015 | Reid ................. | H04W 52/0238 381/94.1 |
| 2008/0130936 A1 * | 6/2008 | Lau ...................... | H04R 1/1041 381/370 |
| 2013/0035893 A1 | 2/2013 | Grokop et al. | |
| 2016/0302003 A1 | 10/2016 | Rahman et al. | |
| 2017/0061951 A1 | 3/2017 | Starobin et al. | |
| 2018/0240453 A1 | 8/2018 | Shibuya | |
| 2018/0254038 A1 * | 9/2018 | Kawano ................. | H04S 7/304 |

* cited by examiner

*Primary Examiner* — George C Monikang
(74) *Attorney, Agent, or Firm* — Patterson + Sheridan, LLP

(57) ABSTRACT

A method performed by a wearable audio output device worn by a user is provided for controlling the reproduction of external noise and/or noise masking. A first a first lower-power detector determines if the user is in transport or a change in the user's transport. In response to the determination, a second higher-power detector exits a power saving state and determines a mode of the transport based. The wearable audio output device adjust a level of attenuation applied by the wearable audio output device to the external noise or adjusting a level of noise masking output by the wearable audio output device based on the determined mode of the transport.

20 Claims, 7 Drawing Sheets

ACTIVE TRANSIT VEHICLE CLASSIFICATION

FIELD

Aspects of the disclosure generally relate to controlling any combination of the reproduction of external noise and audio output by a wearable audio output device worn by a user.

BACKGROUND

Wearable audio output devices having noise cancelling and/or noise masking capabilities have steadily increased in popularity. Modern headphones with active noise reduction (ANR, sometimes referred to as active noise cancelling (ANC)) capabilities attenuate at least some sounds external to the headphones to provide an immersive audio experience to the user. Noise masking reduces external acoustic distractions by playing masking sounds via the speakers of the wearable audio output device. Users may want to selectively set a level of attenuation of external sounds and/or a level of noise masking based on a user's environment and/or an activity being performed by the user. For instance, there may be certain situations when a user wearing the headphones with ANR turned on and/or outputting masking sounds wants to or needs to hear certain external sounds for increased situational awareness. On the other hand, there may be situations when the user may want the ANR to be set to a high level or the noise masking to be set to a higher level to attenuate or cover-up external sounds. While audio devices may allow the user to manually turn on or turn off ANR and noise masking features, there is a need to improve how wearable audio devices adjust a level of ANR and/or noise masking.

SUMMARY

All examples and features mentioned herein can be combined in any technically possible manner.

Aspects provide a method for controlling reproduction of external noise and audio output by a wearable audio output device worn by a user, comprising: detecting sound in the vicinity of the wearable audio output device using at least one microphone in the wearable audio output device; determining, by a first lower-power detector, the user is in transport based, at least in part, on the detected sound; in response to the determination, triggering a second higher-power detector to exit a power saving state and determine a mode of the transport based, at least in part, on the detected sound; and adjusting a level of attenuation applied by the wearable audio output device to the external noise or adjusting a level of noise masking output by the wearable audio output device based on the determined mode of the transport.

In aspects, the method further comprises entering the power saving state by the second higher-power detector after adjusting the level of attenuation applied by the wearable audio output device to the external noise or adjusting the level of noise masking output by the wearable audio output device based on the determined mode of the transport.

In aspects, the first lower-power detector determines the user is in transport based, at least in part, on a first portion of the detected sound and the second higher-power detector determines the mode of the transport based, at least in part, on a second portion of the detected sound. In aspects, the first portion of the detected sound is shorter in time than the second portion of the detected sound.

In aspects, the second higher-power detector determines the mode of the transport based, at least in part, on a classifier model trained using training data comprising known sounds associated with different modes of transport.

In aspects, the adjusting comprises determining how quickly to adjust the level of attenuation or the level of noise masking to be applied by the wearable audio output device based on the determined mode of the transport.

In aspects, the user configures preferences for the adjusting based on the mode of the transport.

In aspects, the method further comprises outputting, by the wearable audio output device, an audio prompt requesting confirmation prior to the adjusting.

In aspects, the first lower-power detector is part of the wearable audio output device, and the second higher-power detector is in wireless communication with the wearable audio output device.

In aspects, the mode of the transport comprises one of: a bus, train, or car.

Certain aspects provide a method for controlling reproduction of external noise and audio output by a wearable audio output device worn by a user, comprising: detecting sound in the vicinity of the wearable audio output device using at least one microphone on the wearable audio output device; detecting a state of motion of the user using a sensor on the wearable audio output device; determining, by a first lower-power detector, the user is in transport based, at least in part, on a first portion of the detected sound and the state of motion of the user; in response to the determination, triggering a second higher-power detector to exit a power saving state and determine the user is in a first mode of the transport based, at least in part, on a second portion of the detected sound; and adjusting a level of attenuation applied by the wearable audio output device to the external noise or adjusting a level of noise masking output by the wearable audio output device based on the determined first mode of the transport.

In aspects, adjusting the level of attenuation or the level of noise masking to be applied by the wearable audio output device based on the determined first mode comprises determining how to quickly to adjust the level of attenuation or the level of noise masking based on the first mode.

In aspects, the first mode comprises one of a bus, car, or train, and adjusting the level of the attenuation or the level of noise masking to be applied based on the first mode comprises adjusting the attenuation to a high level or increasing the level of noise masking.

In aspects, the method further comprises entering a power saving state by the second higher-power detector after the adjusting, determining, by the first lower-power detector a change in transport from the first mode of the transport, exiting the power saving state by the second higher-power detector in response to the change in transport from the first mode and determining by the second higher-power detector the user is in a second mode of the transport, and adjusting the level of attenuation applied by the wearable audio output device to the external noise or adjusting the level of noise masking to be output by the wearable audio output device in response to the change from the first mode to the second mode.

In aspects, the method further comprises entering the power saving state by the second higher-power detector after adjusting the level of attenuation applied by the wearable audio output device or adjusting the level of noise masking to be applied by the wearable audio output device in response to the change from the first mode to the second mode.

In aspects, the first mode of the transport comprises one of: bus, car, or train, the change from the first mode comprises determining the user is no longer on the first mode determined by the second higher-power detector, and adjusting the level of attenuation or the level of noise masking to be applied by the wearable audio output device in response to the change from the first mode to the second mode comprises reducing the level of attenuation or the level of noise masking.

In aspects, reducing the level of attenuation or the level of noise masking comprises entering a transparent mode by the wearable audio output device.

In aspects, adjusting the level of attenuation or the level of noise masking to be applied by the wearable audio output device in response to the change from the first mode to the second mode comprises determining how quickly to adjust the level of attenuation or the level of noise masking based on the second mode.

In aspects, the second higher-power detector determines the first mode and the second mode based, at least in part, on a classifier model trained using training data comprising known sounds associated with different modes of transport.

In aspects, the second higher-power detector determines the first mode and the second mode further based on data collected from one of a sensor on the wearable audio output device or a Global Positioning System data.

In aspects, the method further comprises entering a power saving state by the second higher-power detector after the adjusting, determining, by the first lower-power detector a change in transport from the first mode of the transport to a second mode, wherein the second mode comprises walking, and adjusting the level of attenuation or the level of noise masking in response to the change in transport from the first mode to the second mode by entering a transparent mode.

The details of one or more implementations are set forth in the accompanying drawings and the description below. Other features, objects, and advantages will be apparent from the description and drawings, and from the claims.

DETAILED DESCRIPTION

Aspects of the present disclosure provide methods for automatic, selective ANR control as a function of the user's environment and/or activities, as well as apparatuses and systems configured to implement these methods. As noted in the above paragraphs, a user of a wearable audio output device with active noise reduction capability (e.g., ANR/ANC headphones) may desire that ANR is adapted to suit the user's environment and/or activity being performed by the user. In certain aspects, the user may desire that ANR is continually and automatically adapted in real time based on the user's environment and/or activity. In certain aspects, the user may desire that the ANR level of the headphones is set as a function of sounds including noise in the vicinity of the user.

In an example use case, a user wearing headphones with ANR capability may desire that the ANR is set to a high level when the user is travelling in a mode of transport (e.g., bus, train, airplane etc.) in order to attenuate noises related to the mode of transport including engine noise, wind noise, general noise from other passengers speaking or the like. In an aspect, attenuating external sounds allows the user to listen to audio content being played by the headphone speakers at a lower volume without hearing unwanted sounds, thus achieving a better overall audio experience.

Additionally or alternatively, the user may desire that the ANR level is set as a function of a state of motion of the user including walking, moving (e.g., being in a moving mode of transport) or not moving. For example, the user may desire that the ANR is set to a low level or turned off when the user is walking, so that the user is aware of the user's surroundings and may avoid potential hazards including traffic. On the other hand, the user may desire that the ANR is set to a high setting when travelling in a mode of transport, for example, in order to listen to music.

Certain aspects of the present disclosure discuss techniques for selectively setting ANR levels (or a level of noise masking) automatically based on a user's acoustic environment and/or one or more activities being performed by the user by leveraging sensors in a wearable audio output device. In an aspect, the sensors may include at least one of one or more microphones, one or more accelerometers, one or more magnetometers, or one or more gyroscopes.

Figure 1:
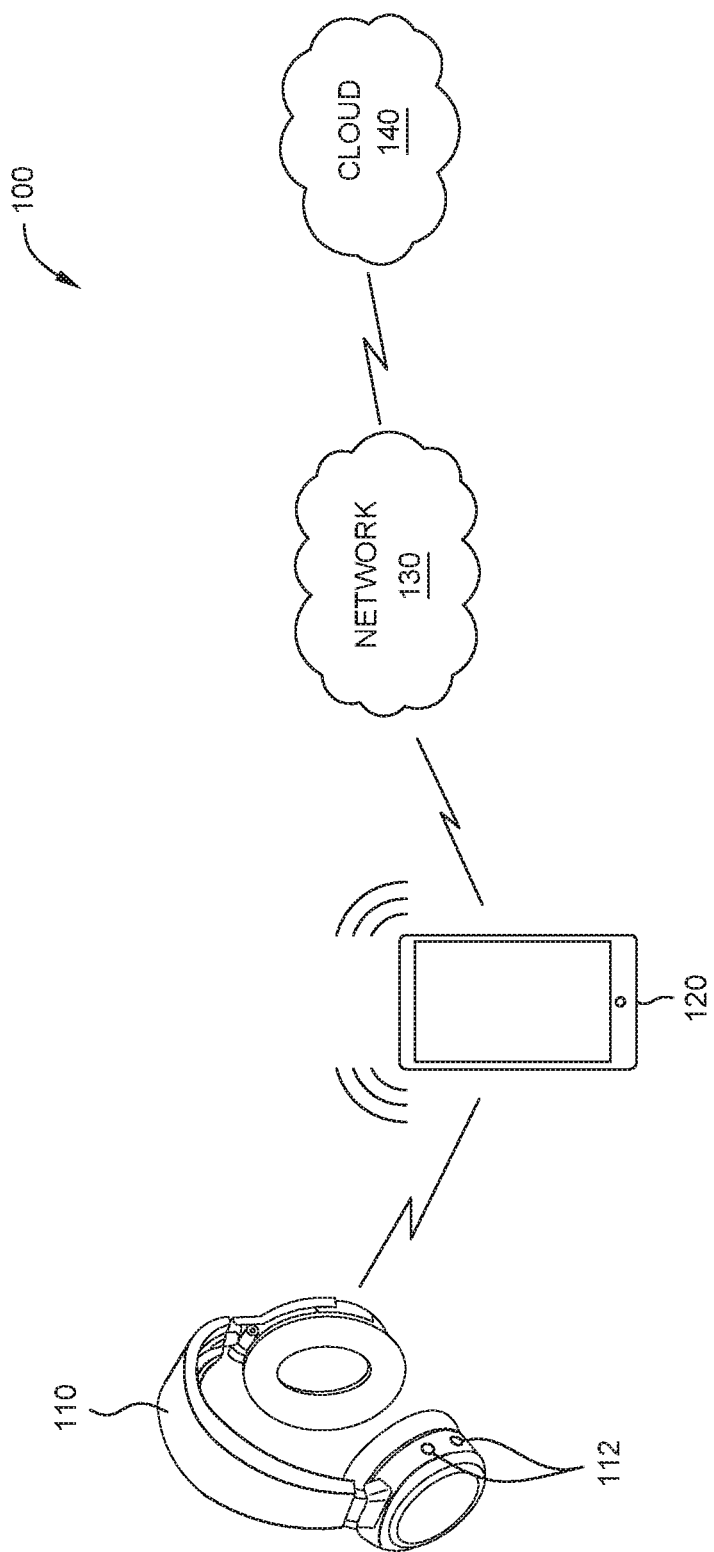
FIG. 1 illustrates an example system in which aspects of the present disclosure may be practiced.

FIG. 1 illustrates an example system 100 in which aspects of the present disclosure may be practiced.

As shown, system 100 includes a pair of headphones 110 communicatively coupled with a portable user device 120. In an aspect, the headphones 110 may include one or more microphones 112 to detect sound in the vicinity of the headphones 110. The headphones 110 also include at least one acoustic transducer (also known as driver or speaker) for outputting sound. The included acoustic transducer(s) may be configured to transmit audio through air and/or through bone (e.g., via bone conduction, such as through the bones of the skull). The headphones 110 may further include hardware and circuitry including processor(s)/processing system and memory configured to implement one or more sound management capabilities or other capabilities including, but not limited to, noise cancelling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry. The noise cancelling circuitry is configured to reduce unwanted ambient sounds external to the headphones 110 by using active noise cancelling. The noise masking circuitry is configured to reduce distractions by playing masking sounds via the speakers of the headphones 110. The movement detecting circuitry is configured to use devices/sensors such as an accelerometer, gyroscope, magnetometer, or the like to detect whether the user wearing the headphones is moving (e.g., walking, running, in a moving mode of transport, etc.) or is at rest and/or the direction the user is looking or facing. The movement detecting circuitry may also be configured to detect a head position of the user for use in augmented reality (AR) applications where an AR sound is played back based on a direction of gaze of the user. The geolocation circuitry may be configured to detect a physical location of the user wearing the headphones. For example, the geolocation circuitry includes Global Positioning System (GPS) antenna and related circuitry to determine GPS coordinates of the user.

In an aspect, the headphones 110 include voice activity detection (VAD) circuitry capable of detecting the presence of speech signals (e.g., human speech signals) in a sound signal received by the microphones 112 of the headphones 110. For instance, as shown in FIG. 1, the microphones 112 of the headphones 110 may receive ambient external sounds in the vicinity of the headphones 110, including speech uttered by a non-user subject. Thus, the sound signal received by the microphones 112 has the speech signal mixed in with other sounds in the vicinity of the headphones 110. Using the VAD, the headphones 110 may detect and extract the speech signal from the received sound signal.

In an aspect, the headphones 110 are wirelessly connected to the portable user device 120 using one or more wireless communication methods including but not limited to Bluetooth, Wi-Fi, Bluetooth Low Energy (BLE), other radio frequency (RF)-based techniques, or the like. In an aspect, the headphones 110 includes a transceiver that transmits and receives information via one or more antennae to exchange information with the user device 120.

In an aspect, the headphones 110 may be connected to the portable user device 120 using a wired connection, with or without a corresponding wireless connection. As shown, the user device 120 may be connected to a network 130 (e.g., the Internet) and may access one or more services over the network. As shown, these services may include one or more cloud services 140.

In aspects, the headphones 110 directly communicate with the network 130 and one or more cloud services 140 (e.g., without the user device 120).

The portable user device 120 is representative of a variety of computing devices, such as mobile telephone (e.g., smart phone) or a computing tablet. In an aspect, the user device 120 may access a cloud server in the cloud 140 over the network 130 using a mobile web browser or a local software application or "app" executed on the user device 120. In an aspect, the software application or "app" is a local application that is installed and runs locally on the user device 120. In an aspect, a cloud server accessible on the cloud 140 includes one or more cloud applications that are run on the cloud server. The cloud application may be accessed and run by the user device 120. For example, the cloud application may generate web pages that are rendered by the mobile web browser on the user device 120. In an aspect, a mobile software application installed on the user device 120 and a cloud application installed on a cloud server, individually or in combination, may be used to implement the techniques for keyword recognition in accordance with aspects of the present disclosure.

It may be noted that although certain aspects of the present disclosure discuss automatic ANR control in the context of headphones 110 for exemplary purposes, any wearable audio output device with similar capabilities may be interchangeably used in these aspects. For instance, a wearable audio output device usable with techniques discussed herein may include over-the-ear headphones, audio eyeglasses or frames, in-ear buds, around-ear audio devices, or the like.

Figure 2:
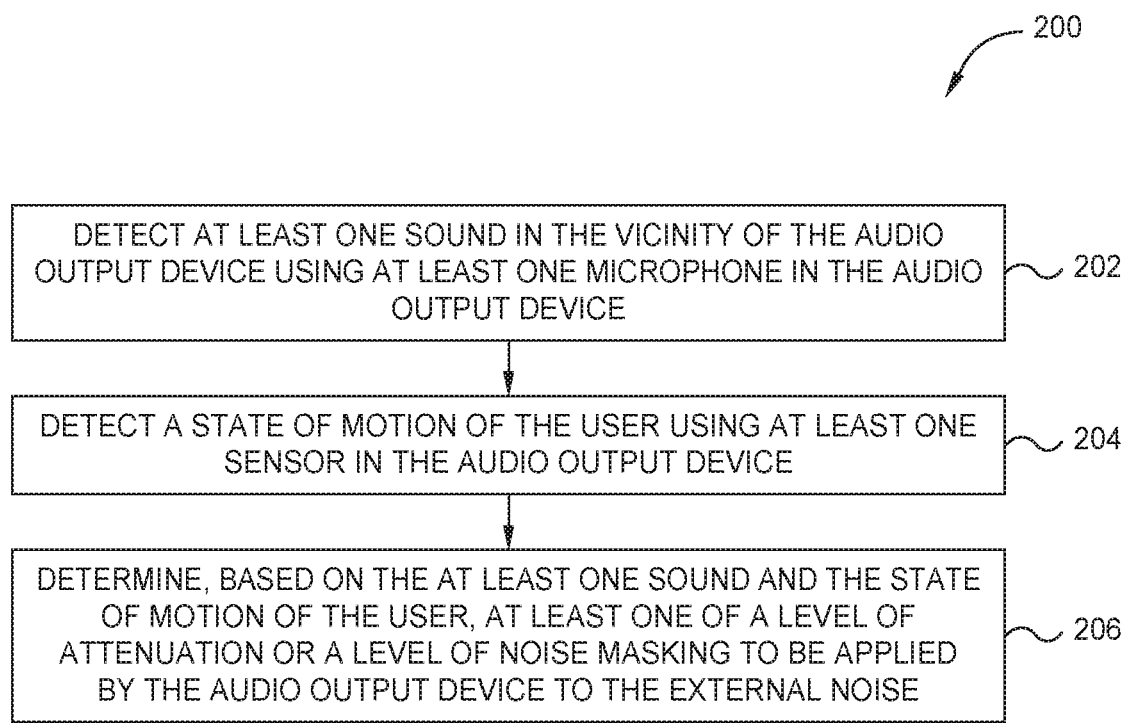
FIG. 2 illustrates example operations performed by a wearable audio output device worn by a user for controlling external noise, in accordance with certain aspects of the present disclosure.

FIG. 2 illustrates example operations 200 performed by a wearable audio output device (e.g., headphones 110 as shown in FIG. 1) worn by a user for controlling external noise, in accordance with certain aspects of the present disclosure. Operations 200 begin, at 202, by detecting at least one sound in the vicinity of the audio output device using at least one microphone in the audio output device. At 204, the audio output device detects a state of motion of the user using at least one sensor in the audio output device. At 206, the audio output device determines, based on the at least one sound and the state of motion of the user, a level of attenuation or a level of noise masking to be applied by the audio output device to the external noise.

In certain aspects, the ambient sounds/noise detected in the vicinity of the headphones (e.g., by one or more microphones on the headphone) may be used to determine information relating to the user's acoustic environment such as whether the user is in a mode of transport (e.g., bus, train, airplane, etc.) based on recognizing sounds/noise typical of the mode of transport.

In certain aspects, one more classifier models may be used to determine the information relating to the user's acoustic environment. Each classifier model may be trained with training data relating to sounds associated with the acoustic environment to be detected by the classifier model. For example, a classifier model may be trained with a set of acoustic features relating to known sounds associated with several modes of transport. Once the classifier model is trained, it may determine a transport class (e.g., whether the user is in a mode of transport) based on the same trained set of features extracted from candidate real time sounds detected in the vicinity of the headphones. In an aspect, a different classifier model may be used for determining different types of acoustic information related to the user's acoustic environments.

In certain aspects, an extraction algorithm may extract plurality of acoustic features from sounds/noise detected in the vicinity of the headphones. Each classifier model may use a subset of the extracted features, same as the subset of features that the classifier model was trained with, for its classification operation. In an aspect, the plurality of features may include at least one of spectral slope, spectral intercept, a coherence factor between the left and right sides of the headphone, zero cross rate, spectral centroid, spectral energy in specific band(s), auto correlation coefficients, short time energy, or spectral flux. It may be noted that this list of acoustic features is non-exhaustive and that one or more other features may be used for each of the classification operations.

In an aspect, the time domain features including zero cross rate, auto correlation coefficients and short time energy may be computed on a frame of size 256 samples. Zero crossing rate counts the number of times the signal crosses zero. Auto correlation coefficients may be computed for each frame over a maximum lag of 16 ms (768 samples) for each frame, and the maximum for each frame may be stored and used as a feature. Short-time energy may be computed as the total energy of the frame (mean of the square of the signal), converted to decibels, dB. All spectral features including spectral slope, spectral intercept, coherence factor, spectral centroid, spectral energy and spectral flux may be based on Fast Fourier Transforms (FFTs) on frames of length 256. The features spectral centroid, spectral energy and spectral flux may be computed from a single frame, and the features spectral slope, spectral intercept and coherence factor may be computed after averaging several frames. Spectral slope and intercept may be computed by taking a linear regression of an average power spectrum (e.g., averaged over 8 consecutive frames) after converting to dB. Left-Right side coherence may be computed by using two signals, one from microphone from each side of the headset, and computing cross and auto spectra (averaged over 8 frames), which may be used to estimate the "magnitude squared coherence: $C=|Pxy|^2/(Pxx*Pyy)$. The Left-Right side coherence feature may then be computed by summing the coherence of the bins up to about 250 Hz. Spectral energy may be computed by summing the energy of the power spectrum over a specific range of frequencies (e.g., low frequency, <500 Hz). Spectral flux may be computed by taking the sum over frequency of the difference of the magnitude spectra from adjacent frames, and by converting to log scale. Spectral centroid may be computed by taking the average of the magnitude of the spectrum times frequency, normalized by the average of the magnitude spectrum.

In an aspect, the detected state of motion of the user may include at least one of walking, running, motion related to a moving mode of transport (e.g., when the user is in a moving bus, train or airplane), or not moving. In as aspect, the state of motion may be detected using at least one sensor configured in the headphones including but not limited to one or more accelerometers, one or more magnetometers, or one or more gyroscopes, or an inertial measurement unit (IMU) including a combination of these sensors.

In an aspect, each state of motion or activity of the user may be detected by using a classifier model trained to detect the state of motion. Each classifier model may be trained based on sensor training data related to the state of motion or activity to be detected by the classifier model. Additionally or alternatively, one or more of the states of motion may be detected by measuring energies associated with signals from one or more of the sensors. For instance, the energy of signals from the accelerometer sensor may be used to determine whether the user is moving, and if moving, whether the user is walking/running or the motion is related to the user being in a moving mode of transport. In an aspect, only one axis (e.g., x axis) of a 3 axis accelerometer may be used for the activity detection. When the energy from the accelerometer signal is below a threshold, the user may be determined as not moving. When the energy from the accelerometer signal is above the threshold, the user is determined as moving. However, motion related to walking/running needs to be distinguished from motion related to user being in a moving mode of transport. Walking/running generally includes several energy peaks in a given time period. Thus, the user may be determined as walking or running when periodic energy peaks are detected. Otherwise, the user's motion is determined as related to the user being in a moving mode of transport.

In certain aspects, decisions regarding a level of attenuation to set for the ANR (or a level of noise masking to be set) may be based on the detected acoustic environment of the user, the detected state of motion or activity of the user, or a combination thereof.

In certain aspects, to avoid detection of false positives or false negatives, the ANR control algorithm may use a combination of sound/noise detection based on microphone input and state of motion detection based on sensor input (e.g., IMU sensor), to determine a level of the ANR (or noise masking) to be set. In an aspect, using a combination of noise/sound detection and state of motion detection ensures that a correct state related to the user's environment is detected. For instance, when a noise/sound detection algorithm (e.g., classifier model) detects that the user is in a mode of transport, and when an algorithm configured to detect the user's state of motion (e.g., classifier model or sensor energy based algorithm) simultaneously detects that the user's motion is related to the user being in a moving mode of transport, the chances of the determination being correct are much higher as compared to the determination being made based on only one of the inputs.

Figure 3:
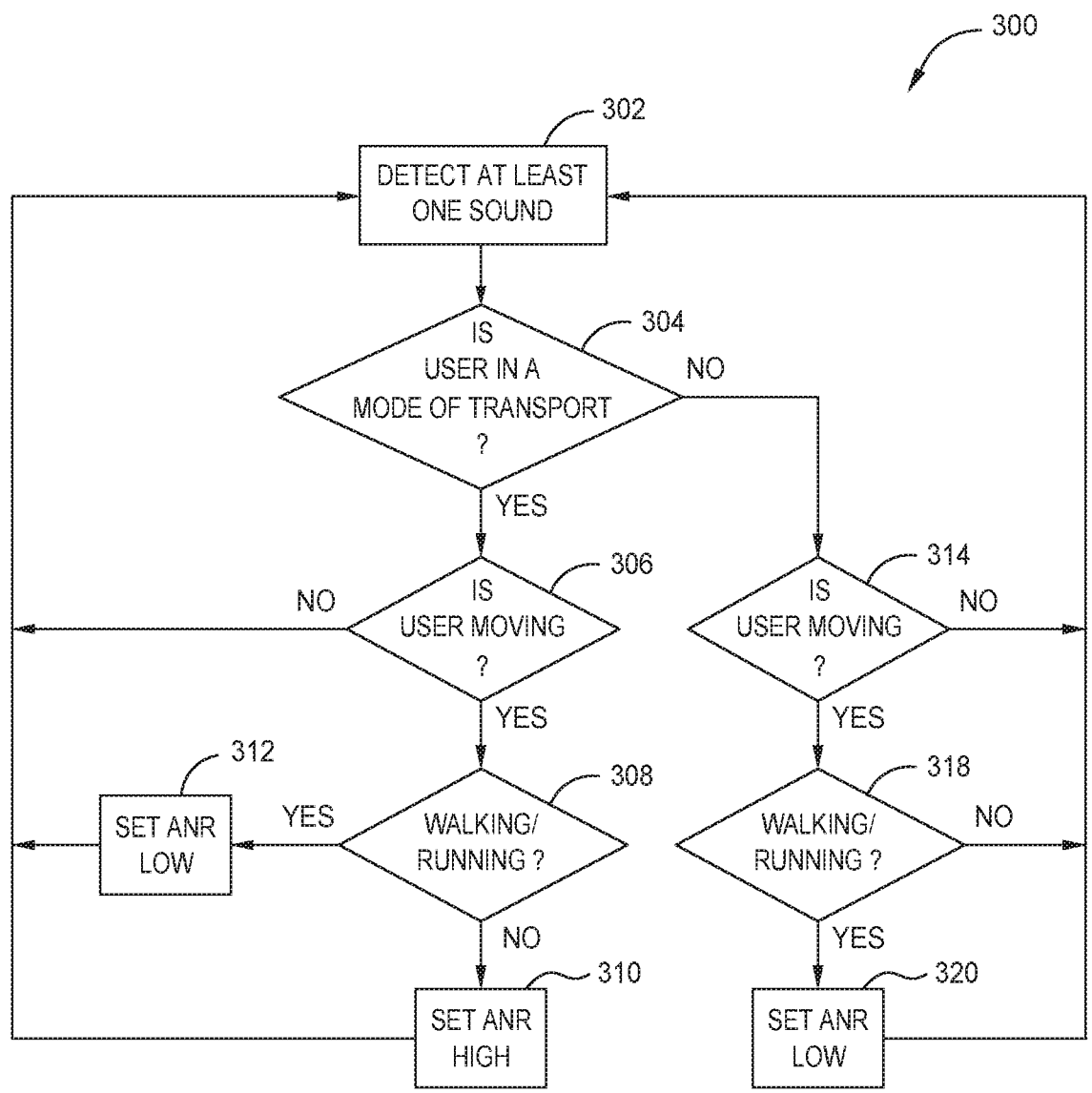
FIG. 3 illustrates example operations for ANR control based on a combination of sound/noise detection and state of motion detection, in accordance with certain aspects of the present disclosure.

FIG. 3 illustrates example operations 300 for ANR control based on a combination of sound/noise detection and state of motion detection, in accordance with certain aspects of the present disclosure.

Operations 300 begin, at 302, by detecting at least one sound in the vicinity of a user by using at least one microphone configured in a wearable audio output device (e.g., headphones 110 of FIG. 1) worn by the user. At 304, it is determined whether the user is in a mode of transport. In an aspect, a trained classifier model may be used to make this determination. If the user is determined as being in a mode of transport, it is determined whether the user is moving at 306. If it is determined that the user is moving, it is further determined at 308 whether the detected motion is related to the user walking/running. In an aspect, one or more sensors (e.g., IMU sensor) may be used to detect at least one body movement of the user, and the state of motion (e.g., the user moving/walking/running) of the user may be determined based on the detected at least one body movement. In an aspect, the determination of the user's state of motion may be based on energies detected by the one or more sensors or based on a trained classifier model. If it is determined that the user is not walking/running at 308, the algorithm assumes that the motion detected at 306 is related to the user being in a mode of transport, and in response, the ANR is set to a high level (e.g., a preconfigured high level) in order to attenuate most sounds external to the headphones. On the other hand, if it is determined at 308 that the user is walking/running, the ANR is set to a low setting (e.g., a preconfigured low setting) or completely turned off to allow the user a higher level of situational awareness. In an aspect, this situation may apply to a case when the user is walking within a mode of transport and needs a higher situational awareness.

At 306, if it is determined that the user is not moving in contradiction to the determination at 304 that the user is in a moving mode of transport, the algorithm assumes that an ambiguous state has occurred and returns back to the initial state 302. In an aspect, a level of ANR currently set is maintained.

At 304, in response to determining that the user is not in a mode of transport, it is determined at 314 whether the user is moving. If the user is detected as moving at 314, it is further determined at 318 whether the user is walking/running. If it is detected at 318 that the user's motion detected at 314 is related to the user walking/running, the ANR is set to a low setting or completely turned off at 320 to allow the user a higher level of situational awareness. On the other hand, if it is determined that the user's motion detected at 314 is not related to the user walking/running, the algorithm assumes an ambiguous state has occurred and returns back to the initial state 302 in order to continue to attempt to detect sounds in the vicinity of the user. Similarly, if it is determined that the user is not moving at all at 314, the algorithm assumes an ambiguous state has occurred and returns back to the initial state 302 in order to continue to attempt to detect sounds in the vicinity of the user. In an aspect, the algorithm maintains a currently set ANR level when an ambiguous state is detected.

In certain aspects, as illustrated by the algorithm of FIG. 3, using a combination of microphone input and sensor input (e.g., IMU sensor input) allows for a more accurate detection of the user's acoustic environment and/or the user's state of motion. For example, when the algorithm detects at 304 based on microphone input that the user is in a mode of transport, this detection is confirmed when it is detected at 306 and 308 based on the IMU sensor that the user is in motion that is not related to the user walking or running. Further, when the algorithm detects at 304 that the user is not in a mode of transport, this detection is confirmed when it is detected at 314 and 318 based on the IMU sensor that the user is walking or running.

In an aspect, when using a combination of microphone input and IMU input for ANR control, the algorithm determines an acoustic environment of the user is detected based on microphone input is correct, only after the IMU detects a user's state of motion matching with the detected acoustic environment for a pre-configured time period. For example, when the algorithm of FIG. 3 detects at 304 that the user is in a mode of transport, the ANR is set to a high level at 310 only if the algorithm simultaneously detects a user motion not relating to the user walking/running for N consecutive seconds. Similarly, when the algorithm of FIG. 3 detects at 304 that the user is not in a mode of transport, the ANR is set to a low level at 320 only if the algorithm simultaneously detects a user motion relating to the user walking/running for N consecutive seconds.

In certain aspects, sound inputs (e.g., from one or more microphones) and sensor inputs (e.g., from accelerometer, magnetometer, gyroscope etc.) are continually analyzed and decisions regarding a level of noise reduction to be set are taken in real time as changes in the user's acoustic environment and/or user activities are detected, and the noise reduction levels are set automatically to suit the detected acoustic environment and/or user activity. In an aspect, the user may configure how the ANR is set for particular acoustic environments, activities or combinations thereof using a software application on the user device (e.g., user device 120 in FIG. 1). This is also illustrated in the algorithm of FIG. 3. As shown in FIG. 3, after setting the ANR to a high setting at 310 or after setting the ANR to a low setting at 320, the algorithm is returned to process block 302 where the algorithm attempts to detect a sound in the vicinity of the user.

Figure 4:
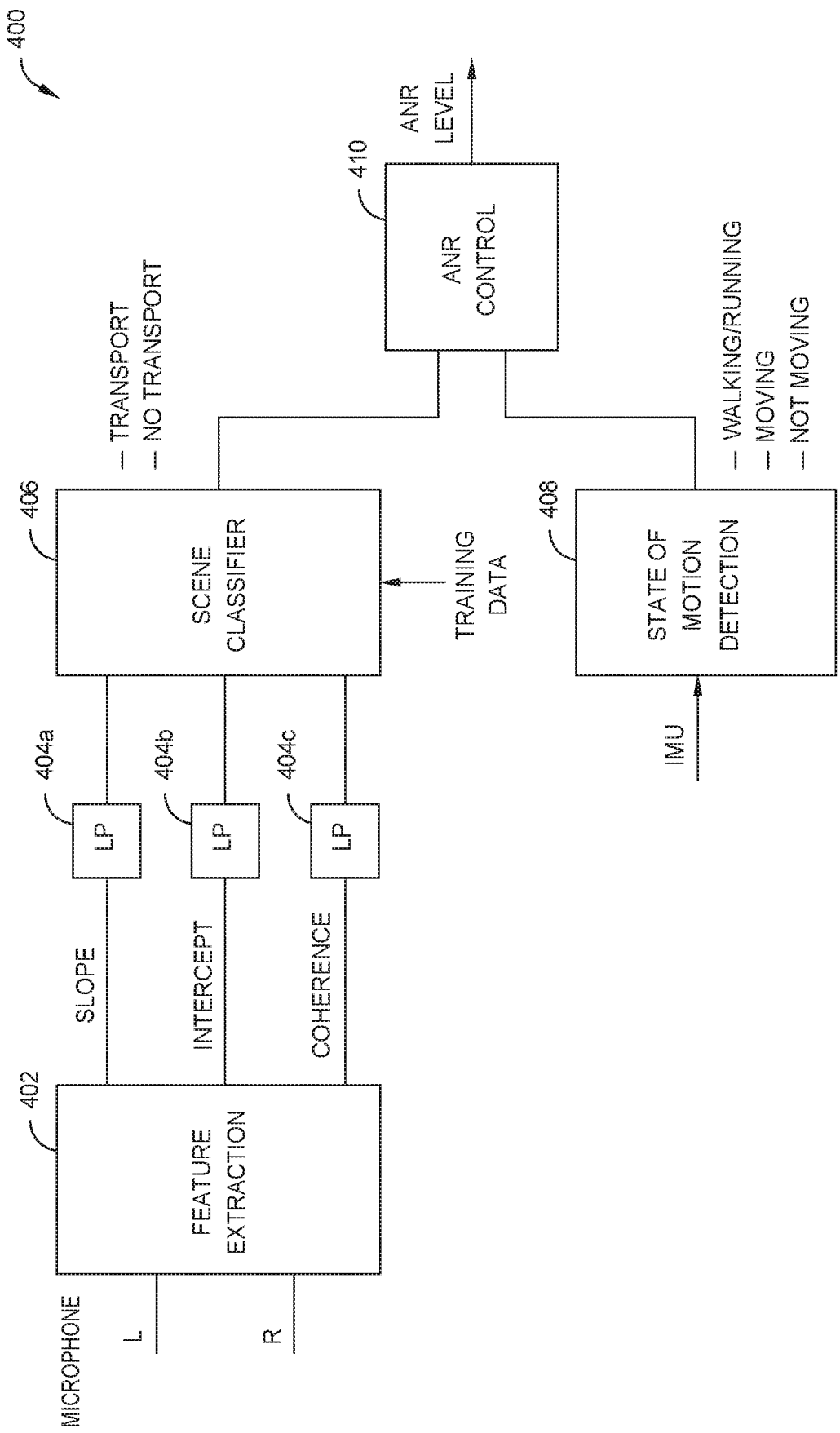
FIG. 4 illustrates an example implementation of automatic noise control, in accordance with certain aspects of the present disclosure.

FIG. 4 illustrates an example implementation system 400 of automatic noise control, in accordance with certain aspects of the present disclosure. In an aspect, the system 400 may be implemented in the headphones, in the user device, or a combination thereof.

As shown in FIG. 4, the system 400 includes a feature extraction module 402, a scene classifier module 406, a state of motion detection module 408, and ANR control module 410. In an aspect, the feature extraction module 402 and the scene classifier module 406, in combination, are configured to determine an acoustic environment of the user including whether the user is in a mode of transport. The state of motion detection module 408 is configured to detect a state of motion of the user including whether the user is walking/running, moving (e.g., in a moving mode of transport), or not moving.

As shown, the feature extraction module 402 accepts microphone input from one or more microphones, for example, from a wearable audio output device such as headphones worn by a user. In an aspect the microphone input may include inputs from microphones placed on the left and right ear cups of the headphones. In an aspect, the microphone input includes a sound signal related to a sound detected by the one or more microphones in the headphones. The feature extraction module 402 is configured to extract one or more acoustic features from the sound signal, for use in detecting the user's acoustic environment. As discussed in the above paragraphs, the acoustic features may include one or more of spectral slope, spectral intercept, a coherence factor between the left and right sides of the headphone, zero cross rate, spectral centroid, spectral energy in specific band(s), auto correlation coefficients, short time energy, or spectral flux. It may be noted that this is not an exhaustive list of acoustic features and that the feature extraction module 402 may be configured to identify other acoustic features not included in this list of acoustic features.

In an aspect, since sounds/noise generally associated with modes of transport (e.g., buses, trains, airplanes etc.) are in the lower frequency range, the feature extraction module 402 samples the sound signal in a lower range of frequencies (e.g., <500 Hz). In an aspect, the feature extraction module uses frames with a frame size of 256 samples, wherein the samples are extracted from a lower frequency range of the received sound signal.

As shown in FIG. 4, for the scene classification, the scene classifier module 406 uses three of the acoustic features extracted by the feature extraction module 402, including spectral slope, spectral intercept and coherence factor. It may be noted that the scene classifier may use any single acoustic feature or any combination of two or more acoustic features from a plurality of acoustic features extracted by the feature extraction module 402. As shown in FIG. 4, each of the extracted features is passed through a low pass filter (404a-404c) before feeding into the scene classifier module 406. In an aspect, each low pass filter passes lower frequency components while cutting out the higher frequency components of the features.

In an aspect, coherence is generally a measure of how closely two signals are related as a function of frequency. Coherence at low frequency is generally high inside a transport vehicle (with little or no wind). Likewise, spectral slope and intercept are sensitive to the same low-frequency energy present from motion of a train or bus and sound energy generated by an engine. In an aspect, the feature extraction module uses microphone inputs from both right and left ears to calculate the coherence factor.

The scene classifier module 406 uses a combination of the spectral slope, spectral intercept and coherence factor to determine whether the user is in a mode of transport. In an aspect, the scene classifier module 406 is a binary tree classifier. As discussed in the above paragraphs, the scene classifier module 406 may be trained using training data relating to sounds associated with several modes of transport (e.g., buses, trains, airplanes etc.). Further, the scene classifier module 406 is trained using the same combination of three features related to known sounds associated with different modes of transport. In an aspect, once the scene classifier model 406 is trained, it may determine a transport class (e.g., whether the user is in of transport) based on the same trained set of three features extracted from candidate real time sounds signal fed to the system.

In an aspect, the state of motion detection module 408 is configured to simultaneously detect a state of motion of the user based on input from an IMU device in the headphones. In an aspect, the state of motion detection module 408 may detect one or more states of motion by measuring energies associated with signals from one or more of the sensors of the IMU device. For instance, the energy of signals from the accelerometer sensor of the IMU device may be used to determine whether the user is moving, and if moving, whether the user is walking/running or the motion is related to the user being in a moving mode of transport. In an aspect, only one axis (e.g., x axis) of a 3 axis accelerometer may be used for the activity detection. When the energy from the accelerometer signal is below a threshold, the user may be determined as not moving. When the energy from the accelerometer signal is above the threshold, the user is determined as moving. However, motion related to walking/running needs to be distinguished from motion related to user being in a moving mode of transport. Walking/running generally includes several energy peaks in a given time period. Thus, the user may be determined as walking or running when periodic energy peaks are detected. Otherwise, the user's motion is determined as related to the user being in a moving mode of transport.

As shown in FIG. 4, the information relating to the acoustic environment/scene of the user as determined by the scene classifier module 406, and the information relating to the state of motion of the user as determined by the state of motion detection module 408 is fed into the ANR control module 410. The ANR control module 410 is configured to determine an ANR level to be set for the headphones based on the acoustic environment/scene of the user and the state of motion of the user. In an aspect, when the ANR control module 410 detects that the user is in a mode of transport and simultaneously detects a user motion not relating to the user walking/running for N consecutive seconds, the ANR control module 410 sets the ANR to a pre-configured high level. Similarly, when ANR control module 410 detects that the user is not in a mode of transport, and simultaneously detects a user motion relating to the user walking/running for N consecutive seconds, the ANR control module 410 sets the ANR to a low level.

In aspects, the scene classifier module 406 and the state of motion detection module 408 are combined into a single module. The single module is configured to perform the operation of both the scene classifier module 406 and state of motion detection module 408. The module receive inputs from the feature extraction module 402 and from the IMU device in the headphones to determine if the user is in transport, not in transport, moving, not moving, walking, or running. The output of the module is provided to the ANR control module 410.

In an aspect, sound inputs (e.g., from one or more microphones) and sensor inputs (e.g., from accelerometer, magnetometer, gyroscope etc.) are continually analyzed by the system 400 and decisions regarding a level of noise reduction to be set are taken in real time as changes in the user's acoustic environment and/or user activities are detected, and the noise reduction levels are set automatically to suit the detected acoustic environment and/or user activity.

In an aspect, the ANR control module 410 may be configured to determine the ANR level based on outputs from any one of the different classifier modules or a combination of outputs from any two or more of the different classifier modules.

As described above, the headphones 110, which may be any wearable audio output device, detect a sound in the vicinity of the user and detect a state of motion of the user. Based on the detected sound and the detected state of motion of the user, the headphones determine at least one of a level of attenuation to apply to external noise or a level of noise masking to output. The level of attenuation to apply ranges from full ANR to a transparent mode where the headphones do not apply any attenuation and includes levels of ANR between full ANR and the transparent mode.

To create an even more customized user-experience, it is beneficial to understand the user's mode of transport. Actions performed by the headphones are based on whether the user is determined to be moving on foot or in a vehicle mode of transport such as a car, bus, train. As an example, the headphones adjust a level of attenuation applied to the reproduction of external noise, adjust a level of noise masking output, and/or perform a user-configured action in response to the user's mode of transport.

Figure 5:
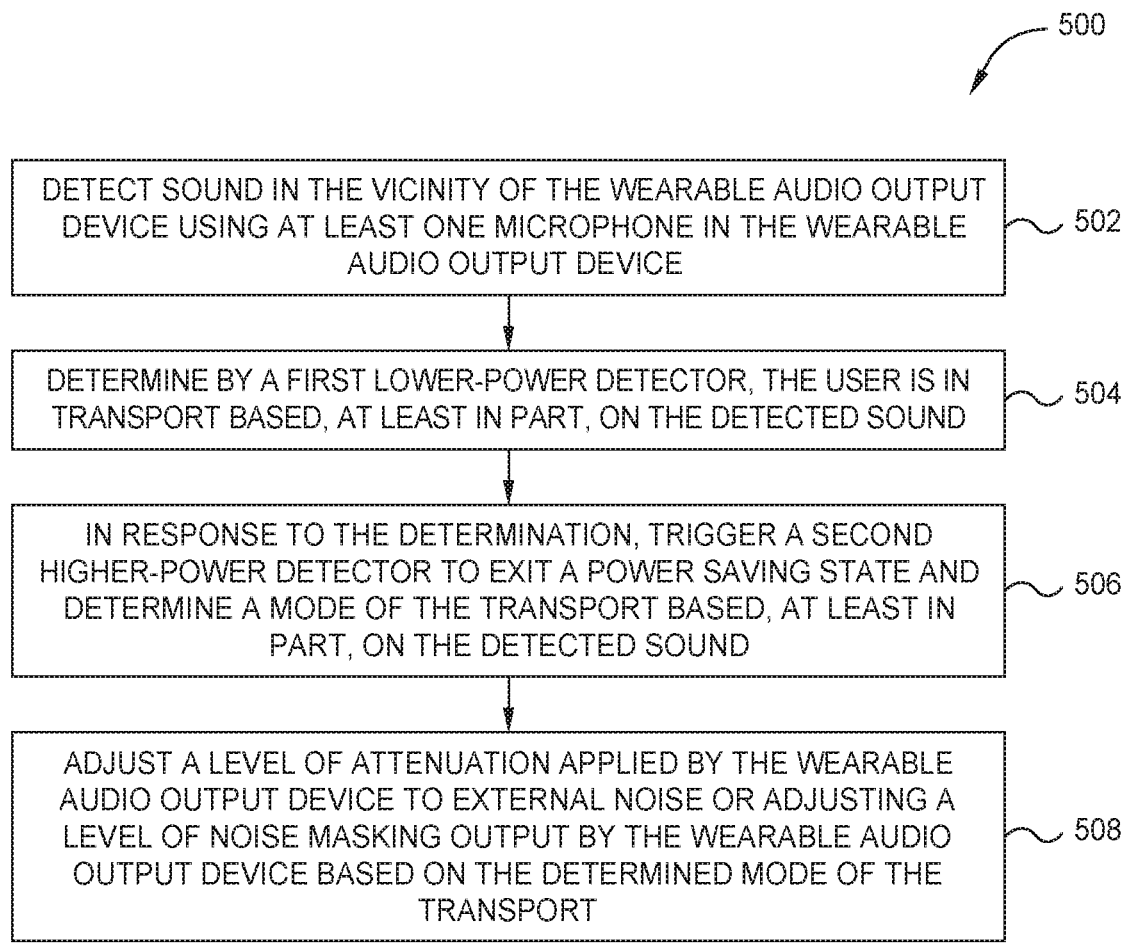
FIG. 5 illustrates example operations for adjusting a level of attenuation and/or adjusting a level of noise masking output based on a determined mode of the transport, in accordance with certain aspects of the present disclosure.

FIG. 5 illustrates example operations 500 performed by a wearable audio output device (e.g., headphones 110 as shown in FIG. 1), in accordance with aspects of the present disclosure. At 502, the wearable audio output device detects sound in the vicinity of the wearable audio output device using at least one microphone in the wearable audio output device. At 504, the wearable audio output device determines, by a first lower-power detector, the user is in transport based, at least in part, on the detected sound. In aspects, the first lower-power detector includes the feature extraction module 402, the scene classifier module 406, and the motion detection module 408. The feature extraction module 402 and the scene classifier module 406, in combination, determine whether the user is in transport. The state of motion detection module 408 determines whether the user is walking/running on foot, in a mode of transport (e.g., car, bus, or train), or not moving.

At 506, in response to the determination that the user is in a mode transport, the wearable audio output device triggers a second higher-power detector to exit a power saving state and determine a mode of the transport based, at least in part, on the detected sound. In aspects, the first lower-power detector triggers the second higher-power detector when the user is determined to be in a vehicle mode of transport. Examples of vehicle modes of transport include a car, bus, or train. In an example, the second higher-power detector is not triggered when the first lower-power detector determines the user is on foot or not moving. As described in more detail below, the first lower-power detector is continuously running. The higher-power detector selectively performs more computationally intensive processes when triggered by the first lower-power detector.

At 508, the wearable audio output device adjusts a level of attenuation applied by the wearable audio output device to the external noise and/or adjusts a level of noise masking output based on the determined mode of the transport.

Figure 6:
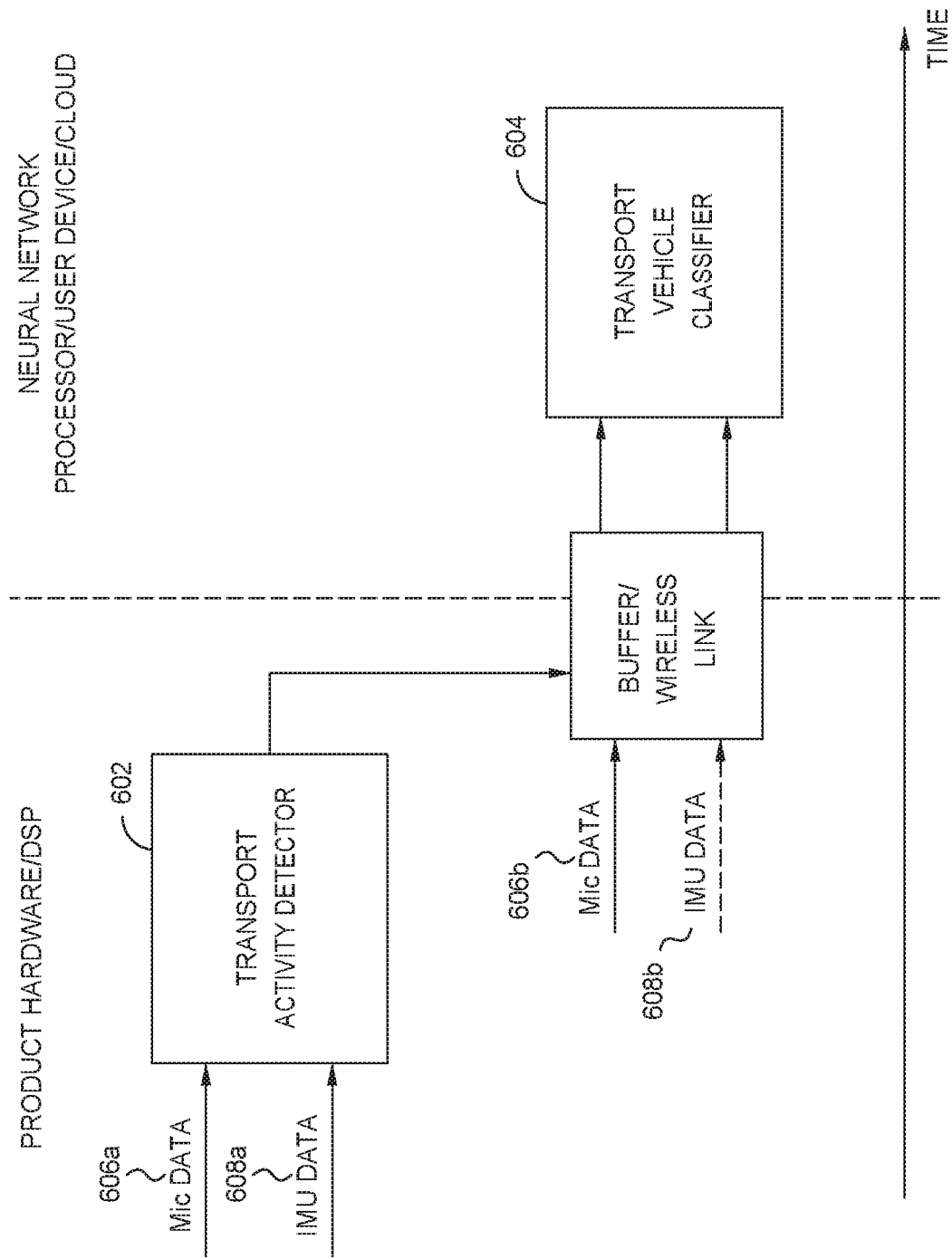
FIG. 6 illustrates example inputs, outputs, and components used to determine the mode of transport, in accordance with aspects of the present disclosure.

FIG. 6 illustrates example inputs, outputs, and components used to determine the user's mode of transport, in accordance with aspects of the present disclosure. In an example, the first lower-power detector is referred to as a transport activity detector 602 and the second higher-power detector is referred to as a transport vehicle classifier 604. Throughout this document, the first lower-power detector is used interchangeably with transport activity detector 602 and the second higher-power detector is used interchangeably with transport vehicle classifier 604. The transport activity detector 602 and transport vehicle classifier 604 collectively determine the user's mode of transport. The transport activity detector 602 includes the feature extraction module 402, the scene classifier module 406, and the motion detection module 408.

In aspects, the transport activity detector 602 is, at least partially, implemented by a combination of hardware in the headphones 110 and firmware that controls the operations of the headphones 110. In one example, the transport activity detector 602 is implemented using a processing unit (such as a digital signal processor (DSP)) or dedicated chip coupled to a memory having instructions stored thereon. In aspects, the transport activity detector 602 is running on the user device 120. In aspects, at least a portion of the transport activity detector 602 is implemented in one or more cloud services 140 accessed via a network 130. In aspects, the cloud services 140 are accessed using a software application ("app") that is installed and runs locally on a user device 120. The transport activity detector 602 is continuously running in an effort to determine if the user is in transport. In an example, the transport activity detector 602 runs in the background (e.g., does not require user intervention) and consumes less power than the transport vehicle classifier 604.

In aspects, the transport vehicle classifier 604 is, at least partially, implemented by a combination of hardware in the headphones 110 and firmware that controls the operations of the headphones 110. In one example, the transport vehicle classifier 604 is implemented using a processing unit or dedicated chip coupled to a memory having instructions stored thereon. In aspects, the transport vehicle classifier 604 is implemented by a neural network in cloud-based services 140. In aspects, the cloud-based services 140 are accessed using a software app that is installed and runs locally on a user device 120.

In one example, the transport activity detector 602 and the transport vehicle classifier 604 each run on different processing units or different chips. In another example, the transport activity detector 602 and the transport vehicle classifier 604 run on a single, multicore processor or chip in the headphones 110. The multicore processor operates in a first configuration when executing the operations performed by the transport activity detector 602 and operates in a second, different configuration when executing the operations performed by the transport vehicle classifier 604.

Regardless of where the transport activity detector 602 and transport vehicle classifier 604 are implemented, the transport activity detector 602 consumes less power to operate than the transport vehicle classifier 604. As described in more detail below, the transport activity detector 602 determines the user is in transport. Determining the user is in transport triggers the transport vehicle classifier 604 to exit a power saving state and determine the user's mode of the transport.

The transport activity detector 602 receives microphone data 606a from one or more microphones 112. The microphone data 606a provides information regarding sounds in the vicinity of the headphones 110. In aspects, the transport activity detector 602 also receives IMU data 608a from one or more sensors on the headphones 110. The IMU data is used to detect at least one body movement of the user. The microphone data 606a in combination with the detected body movement of the user determined using IMU data 608a are used to determine if the user is in transport (e.g., the user moving or not moving) or a change in the user's transport.

A determination that the user is in transport triggers the transport vehicle classifier 604 to exit a power saving state. In an example, the power saving state is any mode in which the transport vehicle classifier 604 saves power by limiting performance. Examples of power saving states include an idle mode or sleep mode. In an example, the transport activity detector 602 transmits a flag or indication to the transport vehicle classifier 604 when the user is determined to be in transport. Upon receiving the flag or indication that the user is in transport, the transport vehicle classifier 604 exits a low-power, power saving state and enters a higher-power, higher performance state to process data in an effort to determine the user's mode of transport.

When transport activity detector 602 determines the user is in transport, microphone data 606b and, optionally, IMU data 608b are buffered and transmitted to the transport vehicle classifier 604. The source of microphone data 606a and 606b are the same; however, the amount of data buffered and used by the transport activity detector 602 and the transport vehicle classifier 604 may be different. For example, the transport vehicle classifier 604 uses more microphone data 606b (a longer time sample of microphone data 606b) as compared to the microphone data 606a used by the transport activity detector 602. At least a portion of the microphone data 606b may occur after the transport activity detector 602 determines the user is in transport using microphone data 606a. Similarly, the source of IMU data 608a and 608b are the same; however, the amount of IMU data buffered and used by the transport activity detector 602 and the transport vehicle classifier 604 may be different. For example, the transport vehicle classifier 604 uses more IMU data 608b (a longer time sample of IMU data 608b) as compared to IMU data 608a used by the transport activity detector 602. At least a portion of the IMU data 608b may occur after the transport activity detector 602 determines the user is in transport using IMU data 608a. In other words, in some aspects, at least a portion of microphone data 606b occurs later in time than microphone data 606a and at least a portion of IMU data 606b occurs later in time than IMU data 608a.

Figure 7:
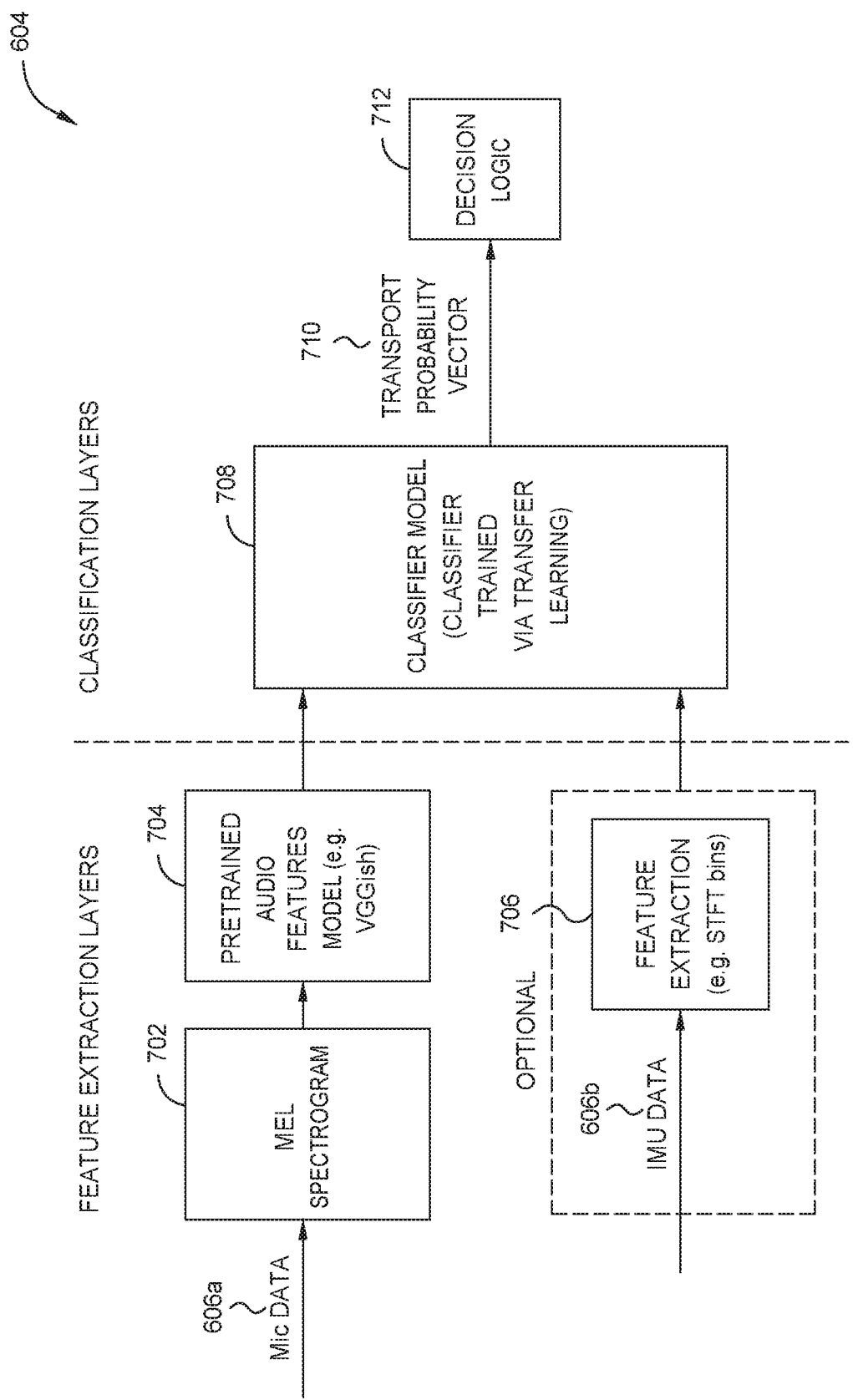
FIG. 7 illustrates example components of the transport vehicle classifier, in accordance with aspects of the present disclosure.

FIG. 7 illustrates example components of the transport vehicle classifier 604, in accordance with aspects of the present disclosure. The microphone data 606b is processed to obtain a visual representation of the acoustic signal. In an example, the visual representation is a Mel spectrogram 702. Data from the Mel spectrogram 702 is input into a pre-trained audio features network 704 to extract lower-level audio features of the microphone data 606b. In an example, a VGGish Feature Extractor determines the lower-level audio features of the microphone data 606b.

A classifier model 708 is trained with a set of features relating to known sounds associated with various modes of transport. In an example, the classifier model 708 is trained with a set of acoustic features. Once trained, the classifier model 708 is used to determine the user's mode of transport using features extracted by the pre-trained audio features network 704.

The classifier model 708 processes the extracted features and determines, with a certain probability, the user's mode of transport. In aspects, the model 708 determines the probability the user is in a car, bus, or train, or in an ambiguous or undetermined mode. When the classifier model 708 outputs a high probability the user is in an ambiguous or undetermined mode of transport, the model 708 may rerun with additional data to determine the user's mode. The classifier model 708 outputs a mode of transport probability vector 710 to a decision logic 712. The mode of transport probability vector 710 indicates the determined probability the user is in each mode of transport or in an ambiguous or undetermined mode of transport. In an example, the mode of transport probability vector 710 indicates the probability the user is in a car, the probability the user is on a bus, the probability the user is on a train, and the probability the user is in an ambiguous or unknown mode of transport based on the extracted features.

Based on the mode of transport probability vector 710, the decision logic 712 determines the user's mode of transport and actions to take in response to the determined mode of transport. In an example, the headphones adjust a level of attenuation applied to the external noise, adjust a masking output, and/or take user-configured action.

Optionally, in addition to microphone data 606*b*, the transport vehicle classifier 604 uses IMU data 608*b*. IMU data 608*b* is input into an IMU feature extraction network 706 to output lower-level features of the IMU data. In an example, Short Time Fourier Transform (STFT) bins are used to extract features from the IMU data 608*b*. The classifier model 708 uses the extracted features from the IMU data, to provide additional data to the classifier model 708. The classifier model 708 uses the additional data in addition to the features extracted by the audio features network 704 to calculate the transport probability vector 710.

While not illustrated in FIG. 7, in aspects GPS data obtained from the headphones 110 or a user device 120 is used to determine the user's speed and/or location. The user's speed and/or location is input into the decision logic 712. In aspects, the GPS data is used in combination with information available on the network 130 to increase confidence that the decision logic 712 selected the correct mode of user transport.

In an example, the decision logic 712 determines the user is on a train. The GPS data indicates that the user is physically located on a bridge having a rail line. The GPS data provides confirmation that the decision logic 712 determined the correct mode of transport.

In another example, the decision logic 712 determines the user is in a car; however, the GPS data indicates that the user is physically located on a bridge having a rail line and not having a road. In response to this contradiction, the decision logic 712 triggers additional microphone data be used for a subsequent Mel spectrogram. The subsequent Mel spectrogram is input into the audio features network to extract lower-level audio features. The extracted features are input into the classifier model 708 to provide a transport mode probability vector based on the additional microphone data. In aspects, the decision logic triggers collection or use of additional information from the IMU, GPS, or other sensors. The additional information is input into the classifier model 708. The classifier model outputs a new transport probability vector 710 to the decision logic 712.

The headphones are configured with the type of action to take and how quickly to take the action based on the user's determined mode of transport. In one example, when the user is determined to be on foot, the headphones are configured to output minimal masking and/or a low level of attenuation, in an effort to allow a user to be aware of his surroundings. The headphones are configured to output a higher level of attenuation and/or a higher level of masking when the user is determined to be on a bus, train, or car. When a user is determined to move from a bus, train, or car to transport on foot, the headphones are configured to quickly reduce or stop the noise attenuation and/or masking, in an effort to allow the user to become aware of his surroundings. In aspects, the headphones enter a transparent mode when the user is determined to be in transport on foot. As described above, in the transparent mode, the headphones stop all attenuation. In aspects, in the transparent mode, the headphones also stop all noise masking. The quick reduction in noise attenuation and sound masking may create a less than ideal user experience while providing the user with nearly immediate acoustic situational awareness. When a user moves from transport by foot to one of transport by bus, train, or car, the headphones gradually increase the level of attenuation or masking to create a more pleasant user experience. In aspects, the audio output gradually adjusts over a period of seconds.

As described above, the headphones are configured with the type of action to take and how quickly to take the action based on the user's determined mode of transport. In aspects, the user is able to modify the configurations so that the headphones take user-configured actions to create personalized user experience. In aspects, the user selects preferences directly on the headphone or using an app stored on the user device 120 in communication with the headphones 110.

The following paragraphs provide an example scenario of a user configuring options of output by the headphones based on the user's mode of transport and the user moving between several modes of transport for illustrative purposes.

In an example scenario, the user configures the headphones to apply a high level of attenuation and/or a high level of noise masking while on a train, a middle level of attenuation when on a bus, no attenuation or noise masking while on foot, and a low level of attenuation and no noise masking while in a car. In aspects, the user also configures the headphones to output an audio prompt requesting user confirmation prior to any changes in audio output. In this example, the user configures to the headphones to output a request confirming the headphones should adjust the level of attenuation when in the user is determined to be in a car.

The transport activity detector 602 receives data from one or more sensors in an effort to determine the user is in transport. In an example, the transport activity detector uses 602 approximately 5 seconds of audio data collected by the microphones 112. Optionally, the transport activity detector 602 also uses IMU data for substantially the same 5 second period of time to determine the user is in transport. When the user is determined to be in a vehicle mode of transport including car, bus, or train (as opposed to transport on foot such as walking or running), the transport activity detector 602 triggers the transport vehicle classifier 604 to exit a low power state and determine the mode of transport. In aspects, the transport vehicle classifier 604 uses a longer sample of audio data than the transport activity detector 602. Similar to audio data, the transport vehicle classifier 604 optionally uses a longer sample of IMU data than the transport activity detector 602.

In one example, the transport vehicle classifier 604 uses approximately 10 seconds of audio data to determine the user's mode of transport. In aspects, a first portion of the audio data is used by the transport activity detector 602 and a second, non-overlapping portion of the audio data is used by the transport vehicle classifier 604. In other aspects, the transport vehicle classifier 604 uses at least a portion of the audio data used by the transport activity detector 602 and additional audio data collected by the microphone 112 to determine the user's mode of transport. The transport vehicle classifier 604 optionally uses IMU and/or GPS data to determine the user's mode of transport. In aspects, a first portion of the IMU data is used by the transport activity detector 602 and a second, non-overlapping portion of the IMU is used by the transport vehicle classifier 604. In other aspects, the transport vehicle classifier 604 uses at least a portion of the IMU data used by the transport activity detector 602 in addition to additional IMU data collected using one or more sensors on the headphones 110.

In this example, the transport vehicle classifier 604 determines the user is on a train. Based on the determination, the headphone adjusts a level of attenuation to be high in accordance with the user's preferences.

After determining the user's mode of transport, the transport vehicle classifier 604 enters a power saving mode while the transport activity detector 602 continuously monitors inputs to determine if the user's mode of transport has changed. When the transport activity detector 602 determines the user's mode of transport has changed, the transport vehicle classifier 604 enters a higher power state, and determines the user's current mode of transport. In response to the current mode of transport, the headphones adjust a level of attenuation applied to the external noise and/or level of noise masking.

Carrying on with the example scenario, the transport activity detector 602 determines the user's mode of transport has changed from being on the train to something else. The transport activity detector 602 determines the user is in transport on foot. Accordingly, the headphones immediately enter a transparent mode.

A few minutes later, the transport activity detector determines the user's mode of transport has changed from transport on foot to a mode of vehicle transport. The transport activity detector 602 triggers the transport vehicle classifier 604 to determine the user's current mode of transport. The transport vehicle classifier 604 determines the user is in a car. Based on the user's preferences, the headphones output an audio request, asking the user to confirm if the headphones should increase the level of attenuation to a low level. The user may respond by voice or motion to either confirm or reject the change in audio output.

It may be noted that the processing related to the automatic ANR control as discussed in aspects of the present disclosure may be performed natively in the headphones, by the user device, or a combination thereof.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method for controlling reproduction of external noise and audio output by a wearable audio output device worn by a user, comprising:
    detecting sound in the vicinity of the wearable audio output device using at least one microphone in the wearable audio output device;
    determining, by a first lower-power detector, the user is in transport based, at least in part, on the detected sound;
    in response to the determination, triggering a second higher-power detector to exit a power saving state and determine a mode of the transport based, at least in part, on the detected sound; and
    adjusting a level of attenuation applied by the wearable audio output device to the external noise or adjusting a level of noise masking output by the wearable audio output device based on the determined mode of the transport.

2. The method of claim 1, further comprising:
    entering the power saving state by the second higher-power detector after adjusting the level of attenuation applied by the wearable audio output device to the external noise or adjusting the level of noise masking output by the wearable audio output device based on the determined mode of the transport.

3. The method of claim 1, wherein:
    the first lower-power detector determines the user is in transport based, at least in part, on a first portion of the detected sound; and
    the second higher-power detector determines the mode of the transport based, at least in part, on a second portion of the detected sound.

4. The method of claim 3, wherein the first portion of the detected sound is shorter in time than the second portion of the detected sound.

5. The method of claim 1, wherein the second higher-power detector determines the mode of the transport based, at least in part, on a classifier model trained using training data comprising known sounds associated with different modes of transport.

6. The method of claim 1, wherein the adjusting comprises:
determining how quickly to adjust the level of attenuation or the level of noise masking to be applied by the wearable audio output device based on the determined mode of the transport.

7. The method of claim 1, wherein the user configures preferences for the adjusting based on the mode of the transport.

8. The method of claim 1, further comprising:
outputting, by the wearable audio output device, an audio prompt requesting confirmation prior to the adjusting.

9. The method of claim 1, wherein:
the first lower-power detector is part of the wearable audio output device; and
the second higher-power detector is in wireless communication with the wearable audio output device.

10. The method of claim 1, wherein the mode of the transport comprises one of: a bus, train, or car.

11. A method for controlling reproduction of external noise and audio output by a wearable audio output device worn by a user, comprising:
detecting sound in the vicinity of the wearable audio output device using at least one microphone on the wearable audio output device;
detecting a state of motion of the user using a sensor on the wearable audio output device;
determining, by a first lower-power detector, the user is in transport based, at least in part, on a first portion of the detected sound and the state of motion of the user;
in response to the determination, triggering a second higher-power detector to exit a power saving state and determine the user is in a first mode of the transport based, at least in part, on a second portion of the detected sound; and
adjusting a level of attenuation applied by the wearable audio output device to the external noise or adjusting a level of noise masking output by the wearable audio output device based on the determined first mode of the transport.

12. The method of claim 11, wherein adjusting the level of attenuation or the level of noise masking to be applied by the wearable audio output device based on the determined first mode comprises:
determining how to quickly to adjust the level of attenuation or the level of noise masking based on the first mode.

13. The method of claim 11, wherein the first mode comprises one of a bus, car, or train; and
adjusting the level of the attenuation or the level of noise masking to be applied based on the first mode comprises adjusting the attenuation to a high level or increasing the level of noise masking.

14. The method of claim 11, further comprising:
entering a power saving state by the second higher-power detector after the adjusting;
determining, by the first lower-power detector a change in transport from the first mode of the transport;
exiting the power saving state by the second higher-power detector in response to the change in transport from the first mode and determining by the second higher-power detector the user is in a second mode of the transport; and
adjusting the level of attenuation applied by the wearable audio output device to the external noise or adjusting the level of noise masking to be output by the wearable audio output device in response to the change from the first mode to the second mode.

15. The method of claim 14, further comprising:
entering the power saving state by the second higher-power detector after adjusting the level of attenuation applied by the wearable audio output device or adjusting the level of noise masking to be applied by the wearable audio output device in response to the change from the first mode to the second mode.

16. The method of claim 14, wherein:
the first mode of the transport comprises one of: bus, car, or train;
the change from the first mode comprises determining the user is no longer on the first mode determined by the second higher-power detector; and
adjusting the level of attenuation or the level of noise masking to be applied by the wearable audio output device in response to the change from the first mode to the second mode comprises reducing the level of attenuation or the level of noise masking.

17. The method of claim 16, wherein reducing the level of attenuation or the level of noise masking comprises entering a transparent mode by the wearable audio output device.

18. The method of claim 14, wherein adjusting the level of attenuation or the level of noise masking to be applied by the wearable audio output device in response to the change from the first mode to the second mode comprises:
determining how quickly to adjust the level of attenuation or the level of noise masking based on the second mode.

19. The method of claim 14, wherein the second higher-power detector determines the first mode and the second mode based, at least in part, on a classifier model trained using training data comprising known sounds associated with different modes of transport.

20. The method of claim 11, further comprising:
entering a power saving state by the second higher-power detector after the adjusting;
determining, by the first lower-power detector, a change in transport from the first mode of the transport to a second mode, wherein the second mode comprises walking; and
adjusting the level of attenuation or the level of noise masking in response to the change in transport from the first mode to the second mode by entering a transparent mode.

* * * * *